(12) United States Patent  (10) Patent No.: US 8,494,261 B2
Tomi  (45) Date of Patent: Jul. 23, 2013

(54) IMAGE PROCESSING APPARATUS, IMAGE PROCESSING METHOD, AND COMPUTER-READABLE MEDIUM

(75) Inventor: Hideyasu Tomi, Yokohamo (JP)

(73) Assignee: Canon Kabushiki Kaisha, Tokyo (JP)

( * ) Notice: Subject to any disclaimer, the term of this patent is extended or adjusted under 35 U.S.C. 154(b) by 176 days.

(21) Appl. No.: 13/085,608

(22) Filed: Apr. 13, 2011

(65) Prior Publication Data

US 2011/0268352 A1    Nov. 3, 2011

(30) Foreign Application Priority Data

Apr. 30, 2010  (JP) ................................. 2010-105962

(51) Int. Cl.
*G06K 9/00* (2006.01)

(52) U.S. Cl.
USPC ........................................................ 382/162

(58) Field of Classification Search
USPC ................. 382/162, 166, 165, 171, 181, 190, 382/232–233; 358/1.1, 1.9, 2.1, 3.01, 520, 358/538, 539, 426.01; 375/240, 240.24, E7.075, 375/E7.176, E7.258, E7.259
See application file for complete search history.

(56) References Cited

U.S. PATENT DOCUMENTS

| 5,933,249 | A  | 8/1999  | Shimura et al. ............... 358/429 |
| 6,243,416 | B1 | 6/2001  | Matsushiro et al. .......... 375/240 |
| 7,844,120 | B2 | 11/2010 | Yamamoto ..................... 382/232 |
| 8,331,705 | B2 | 12/2012 | Shiraishi et al. .............. 382/238 |
| 2002/0113898 | A1 | 8/2002 | Mitsuhashi .................... 348/578 |
| 2011/0158522 | A1 | 6/2011 | Tsujii ............................ 382/166 |
| 2011/0222082 | A1 | 9/2011 | Tomi ............................. 358/1.9 |
| 2011/0229027 | A1 | 9/2011 | Shibuya ........................ 382/166 |

FOREIGN PATENT DOCUMENTS

| JP | 07-236062 A   | 9/1995  |
| JP | 10-257488 A   | 9/1998  |
| JP | 10-290391 A   | 10/1998 |
| JP | 2000-358194 A | 12/2000 |
| JP | 2002-271791 A | 9/2002  |
| JP | 2004-104621 A | 4/2004  |
| JP | 2007-143082 A | 6/2007  |

*Primary Examiner* — Jose Couso

(74) *Attorney, Agent, or Firm* — Fitzpatrick, Cella, Harper & Scinto

(57) ABSTRACT

An image processing apparatus comprises: an unit configured to sequentially determine, as a processing object, each of blocks, and to compare color data of respective pixels in the block that is the processing object, thereby specifying a pattern flag indicating an arrangement pattern of color data; an unit configured to extract first color data from a pixel, and further to extract second color data to fourth color data corresponding to the arrangement pattern; an unit configured to hold the pattern flag of each of the blocks, the first color data, and the second color data to fourth color data; and an unit configured to specify addresses in a memory, at which the first color data and the second color data to fourth color data in a block to be composed are held.

8 Claims, 23 Drawing Sheets

FIG. 3
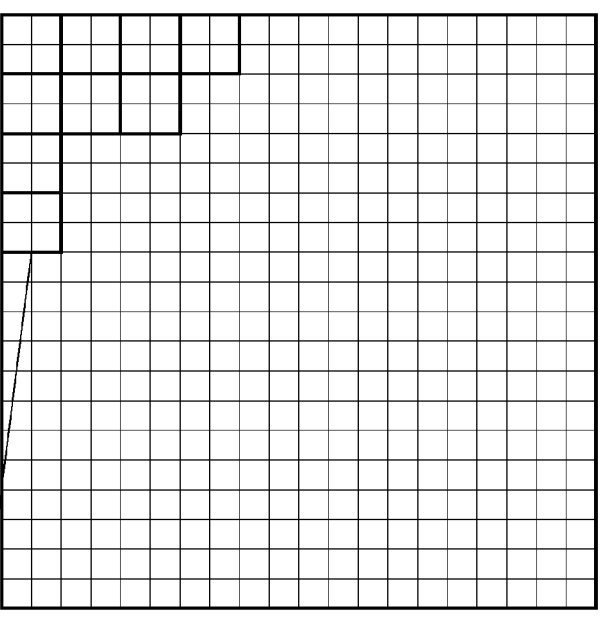
| IMAGE | |
|---|---|
|  | SAME COLOR FOR ALL PIXELS : ONE PATTERN |
|  | TWO COLORS: SEVEN PATTERNS |
| 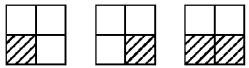 | THREE COLORS: SIX PATTERNS |
|  | DIFFERENT COLORS FOR ALL PIXELS: ONE PATTERN |

FIG. 4
| IMAGE | FLAG |
|:---:|:---:|
|  | 0 |
|  | 1 |
|  | 2 |
|  | 3 |
|  | 4 |
|  | 5 |
|  | 6 |
|  | 7 |
|  | 8 |
|  | 9 |
|  | A |
|  | B |
|  | C |
|  | D |
|  | E |

FIG. 6

| IMAGE | COMPARISON RESULT | | | | | | PATTERN FLAG |
|---|---|---|---|---|---|---|---|
| | 1-2 bit 0 | 1-3 bit 1 | 1-4 bit 2 | 2-3 bit 3 | 2-4 bit 4 | 3-4 bit 5 | |
| | 1 | 1 | 1 | 1 | 1 | 1 | 0 |
| | 0 | 1 | 1 | 0 | 0 | 1 | 1 |
| | 0 | 0 | 1 | 1 | 0 | 0 | 2 |
| | 0 | 1 | 0 | 0 | 1 | 0 | 3 |
| | 0 | 0 | 0 | 1 | 1 | 1 | 4 |
| | 1 | 0 | 1 | 0 | 1 | 0 | 5 |
| | 1 | 1 | 0 | 1 | 0 | 0 | 6 |
| | 1 | 0 | 0 | 0 | 0 | 1 | 7 |
| | 0 | 1 | 0 | 0 | 0 | 0 | 8 |
| | 0 | 0 | 1 | 0 | 0 | 0 | 9 |
| | 0 | 0 | 0 | 0 | 0 | 1 | A |
| | 0 | 0 | 0 | 1 | 0 | 0 | B |
| | 0 | 0 | 0 | 0 | 1 | 0 | C |
| | 1 | 0 | 0 | 0 | 0 | 0 | D |
| | 0 | 0 | 0 | 0 | 0 | 0 | E |

F I G. 10A

| COORDINATE POSITION (X, Y) | PACKET SIZE (Byte) | ADDRESS |
|---|---|---|
| (0, 0) | 32 | 0x10000000 |
| (1, 0) | 48 | 0x10000020 |
| (2, 0) | 36 | 0x10000050 |
| (3, 0) | 128 | 0x10000074 |
| ⋮ | ⋮ | |
| (X, Y) | 36 | 0x10010020 |

F I G. 10B

| COORDINATE POSITION (X, Y) | PACKET SIZE (Byte) | ADDRESS |
|---|---|---|
| (0, 0) | 896 | 0x10000000 |
| (1, 0) | 2248 | 0x10000380 |
| (0, 1) | 1496 | 0x10000c48 |
| (1, 1) | 1896 | 0x10001220 |
| (0, 2) | 2496 | 0x10001988 |
| (1, 2) | 1248 | 0x10002348 |

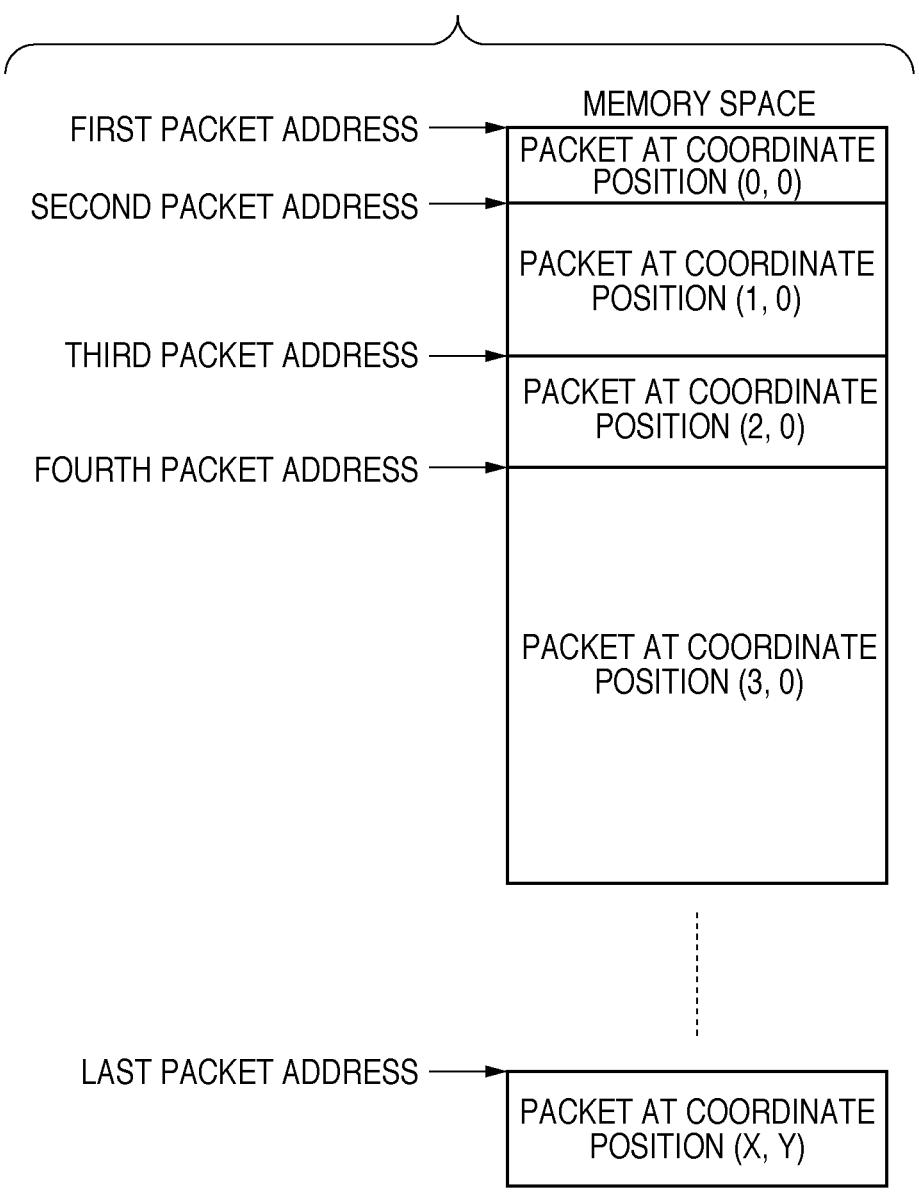

PACKET
- HEADER
- PATTERN FLAG STORAGE UNIT
- FIRST COLOR PIXEL DATA STORAGE UNIT

PAGE ID : 01

TILE COORDINATE POSITION
 X : 0
 Y : 0

COLOR SPACE : RGB

THE NUMBER OF BITS
OF PIXEL DATA : 8bit

DATA SIZE
AND SECOND, THIRD,
AND FOURTH COLOR SIZES : 0bit

RESOLUTION: 300dpi

COMPOSITION COLOR: R0, G0, B0 (BLACK)

COORDINATE POSITION (x, y) :
(0, 3), (1, 3), (2, 3), (3, 3), (3, 4), (3, 5),
(0, 6), (1, 6), (2, 6), (3, 6), (3, 7), (3, 8),
(0, 9), (1, 9), (2, 9), (3, 9)

COMPOSITION CONDITION: OVERWRITING

FIG. 16
| IMAGE | FLAG | SIZE(Byte) |
|---|---|---|
|  | 0 | 0 |
|  | 1 | |
|  | 2 | |
|  | 3 | |
|  | 4 | 3 |
|  | 5 | |
|  | 6 | |
|  | 7 | |
|  | 8 | |
|  | 9 | |
|  | A | 6 |
|  | B | |
|  | C | |
|  | D | |
|  | E | 9 |

FIG. 18

| COORDINATE POSITION (X, Y) | FLAG | ADDRESS OF SECOND, THIRD, AND FOURTH COLOR PIXEL DATA |
|---|---|---|
| (0, 0) | 0 | 0x100026D8 |
| (0, 1) | 2 | 0x100026D8 |
| (0, 2) | A | 0x100026D8 |
| (0, 3) | E | 0x100026E1 |
| (0, 4) | 8 | 0x100026EA |

| Packet (0, 0) | Packet (1, 0) |
|---|---|
| Packet (0, 1) | Packet (1, 1) |
| Packet (0, 2) | Packet (1, 2) |

| Packet (0, 0) | Packet (1, 0) |
|---|---|
| Packet (0, 1) | Packet (1, 1) |
| Packet (0, 2) | Packet (1, 2) |

FIG. 22A

---
COORDINATE POSITION: 600dpi
---
COMPOSITION COLOR: R64, G64, B64
---
COORDINATE POSITION (x, y):
(0, 3), (1, 3), (2, 3), (3, 3), (3, 4), (3, 5),
(0, 6), (1, 6), (2, 6), (3, 6), (3, 7), (3, 8),
(0, 9), (1, 9), (2, 9), (3, 9)
---
COMPOSITION CONDITION: OVERWRITING
---
COMPOSITION VALUE OF
ATTRIBUTE DATA: 0xFF (TEXT)
---

FIG. 22B

| COORDINATE POSITION (X, Y) | PACKET SIZE (Byte) | ADDRESS |
|---|---|---|
| (0, 0) | 1280 | 0x10000000 |
| (1, 0) | 2248 | 0x10001000 |
| (0, 1) | 1496 | 0x10002000 |
| (1, 1) | 1896 | 0x10003000 |
| (0, 2) | 2496 | 0x10004000 |
| (1, 2) | 1680 | 0x10005000 |

FIG. 24A

| COORDINATE POSITION (X, Y) | FLAG | ADDRESS OF SECOND, THIRD, AND FOURTH COLOR PIXEL DATA |
|---|---|---|
| (0, 0) | 0 | 0x10005390 |
| (0, 1) | 2 | 0x10005390 |
| (0, 2) | A | 0x10005393 |
| (0, 3) | E | 0x10005399 |
| (0, 4) | 8 | 0x100053A2 |

FIG. 24B

| COORDINATE POSITION (X, Y) | FLAG | ADDRESS OF ATTRIBUTE DATA CORRESPONDING TO SECOND, THIRD, AND FOURTH COLOR PIXEL DATA |
|---|---|---|
| (0, 0) | 0 | 0x10005610 |
| (0, 1) | 2 | 0x10005610 |
| (0, 2) | 0 | 0x10005613 |
| (0, 3) | 0 | 0x10005613 |
| (0, 4) | 8 | 0x100056A2 |

IMAGE PROCESSING APPARATUS, IMAGE PROCESSING METHOD, AND COMPUTER-READABLE MEDIUM

BACKGROUND OF THE INVENTION

1. Field of the Invention

The present invention relates to an image data compression apparatus which compresses image data for each predetermined block, and an image processing apparatus which performs image processing and restoration processing for the compressed data. The present invention more particularly relates to an image processing apparatus which performs composition processing for the compressed data.

2. Description of the Related Art

Conventionally, a JPEG scheme which uses discrete cosine transformation and a scheme which uses wavelet transformation are widely employed as color still image compression schemes. Encoding schemes of these kinds generally encode image data for each predetermined block (for example, for each unit of 8×8 or 16×16 pixels), and perform discrete cosine transformation, quantization, and entropy coding, thereby realizing high compression efficiency. Since encoding schemes of these kinds use variable-length coding, the code length changes for each image data to be encoded. To perform discrete cosine transformation processing for each block at high speed, not only a high-speed arithmetic unit and dedicated hardware but also a buffer memory is necessary.

Also, the number of pixels which require image processing typified by composition processing has dramatically increased together with an increase in resolution, which also increases the processing load. To execute image processing of referring to pixel data and converting its value for compressed data having undergone the above-mentioned image compression, decoding the compressed data becomes necessary. In other words, image processing typified by composition processing cannot be performed for compressed data intact, so the decoding of compressed data inevitably becomes necessary. This makes it necessary to process all pixels in high-resolution data for each pixel, thus prolonging the processing time.

Japanese Patent Laid-Open No. 2000-358194 proposes an image composition apparatus for preventing prolongation of the image composition processing time with an increase in resolution. According to Japanese Patent Laid-Open No. 2000-358194, reduced images of a plurality of image data to be composed are generated, and extraction of overlapping regions and alignment are performed. Based on the information obtained by these operations, the image data are composed.

However, in the method disclosed in Japanese Patent Laid-Open No. 2000-358194, the processing time prolongs generating reduced images since reduced images of image data that are to be composed must be generated. Also, since composition processing is performed for image data before reduction, the memory capacity for temporary storage increases.

SUMMARY OF THE INVENTION

The present invention has been made in consideration of the foregoing problems, and provides an image processing apparatus which processes only a region in which image composition is performed while image data is in a compressed state, therefore requiring only a short period of time and at a low cost to process even high-resolution image data.

According to one aspect of the present invention, there is provided an image processing apparatus comprising: a tile division unit configured to divide input image data into tiles each including a predetermined number of pixels; a block division unit configured to divide each of the tiles, that are divided by the tile division unit, into blocks each having a size of M×N pixels; a pattern flag specification unit configured to sequentially determine, as a processing object, each of the blocks divided by the block division unit, and to compare color data of respective pixels in the block that is the processing object, thereby specifying a pattern flag indicating an arrangement pattern of color data included in each of the blocks; an extraction unit configured to extract first color data from a pixel at a predefined position in each of the blocks, and further to extract, from a block for which it is determined that the number of color data included in the block is one of 2 to 4, second color data to fourth color data corresponding to the arrangement pattern defined in the specified pattern flag; a first holding unit configured to hold, in a memory, the pattern flag of each of the blocks, that is specified by the pattern flag specification unit, the first color data extracted by the extraction unit, and the second color data to fourth color data extracted by the extraction unit; an address specification unit configured to specify addresses in the memory, at which the first color data and the second color data to fourth color data in a block to be composed are held, based on composite image data to be composed; and a composition unit configured to rewrite the first color data and the second color data to fourth color data in the block to be composed, that are held at the addresses specified by the address specification unit, based on the color data of the composite image data.

According to another aspect of the present invention, there is provided an image processing method comprising: a tile division step of using a tile division unit to divide input image data into tiles each including a predetermined number of pixels; a block division step of using a block division unit to divide each of the tiles, that are divided in the tile division step, into blocks each having a size of M×N pixels; a pattern flag specification step of using a pattern flag specification unit to sequentially determine, as a processing object, each of the blocks divided in the block division step, and compare color data of respective pixels in the block that is the processing object, thereby specifying a pattern flag indicating an arrangement pattern of color data included in each of the blocks; an extraction step of using an extraction unit to extract first color data from a pixel at a predefined position in each of the blocks, and further extract, from a block for which it is determined that the number of color data included in the block is one of 2 to 4, second color data to fourth color data corresponding to the arrangement pattern defined in the specified pattern flag; a first holding step of using a first holding unit to hold, in a memory, the pattern flag of each of the blocks, that is specified in the pattern flag specification step, the first color data extracted in the extraction step, and the second color data to fourth color data extracted in the extraction step; an address specification step of using an address specification unit to specify addresses in the memory, at which the first color data and the second color data to fourth color data in a block to be composed are held, based on composite image data to be composed; and a composition step of using a composition unit to rewrite the first color data and the second color data to fourth color data in the block to be composed, that are held at the addresses specified in the address specification step, based on the color data of the composite image data.

According to another aspect of the present invention, there is provided a computer-readable medium storing a program for causing a computer to function as: a tile division unit configured to divide input image data into tiles each including a predetermined number of pixels; a block division unit configured to divide each of the tiles, that are divided by the tile division unit, into blocks each having a size of M×N pixels; a pattern flag specification unit configured to sequentially determines, as a processing object, each of the blocks divided by the block division unit, and to compare color data of respective pixels in the block that is the processing object, thereby specifying a pattern flag indicating an arrangement pattern of color data included in each of the blocks; an extraction unit configured to extract first color data from a pixel at a predefined position in each of the blocks, and further extracts, from a block for which it is determined that the number of color data included in the block is one of 2 to 4, second color data to fourth color data corresponding to the arrangement pattern defined in the specified pattern flag; a first holding unit configured to hold, in a memory, the pattern flag of each of the blocks, that is specified by the pattern flag specification unit, the first color data extracted by the extraction unit, and the second color data to fourth color data extracted by the extraction unit; an address specification unit configured to specify addresses in the memory, at which the first color data and the second color data to fourth color data in a block to be composed are held, based on composite image data to be composed; and a composition unit configured to rewrite the first color data and the second color data to fourth color data in the block to be composed, that are held at the addresses specified by the address specification unit, based on the color data of the composite image data.

According to the present invention, it is possible to provide an image processing apparatus which requires only a short period of time and low cost to process even high-resolution image data.

Further features of the present invention will become apparent from the following description of exemplary embodiments with reference to the attached drawings.

BRIEF DESCRIPTION OF THE DRAWINGS

FIG. 3 is a view showing the patterns of blocks obtained upon dividing an image into blocks according to the embodiment;

FIG. 4 is a view showing a list of patterns of blocks and their identifiers according to the embodiment;

FIG. 6 is a view showing the process of converting the patterns of blocks into flags according to the embodiment;

FIGS. 10A and 10B are tables illustrating examples of packet management tables according to the first embodiment;

FIG. 11 is a view showing the layout of compressed data on a memory space according to the first embodiment;

FIG. 16 is a view showing the relationship between the pattern flag and the size of second, third, and fourth color pixel data;

FIG. 18 is a view showing the relationship between the block coordinate position and the address of second, third, and fourth color pixel data in packet (1, 2) according to the first embodiment;

FIGS. 22A and 22B are views illustrating examples of composition information and a packet management table, respectively, according to the second embodiment;

FIGS. 24A and 24B are views showing the relationship between the block coordinate position, second, third, and fourth color pixel data, and the address of attribute data corresponding to these data in packet (1, 2) according to the second embodiment.

DESCRIPTION OF THE EMBODIMENTS

Modes for carrying out the present invention will be described below with reference to the accompanying drawings.

<First Embodiment>

[System Configuration]

Figure 1:
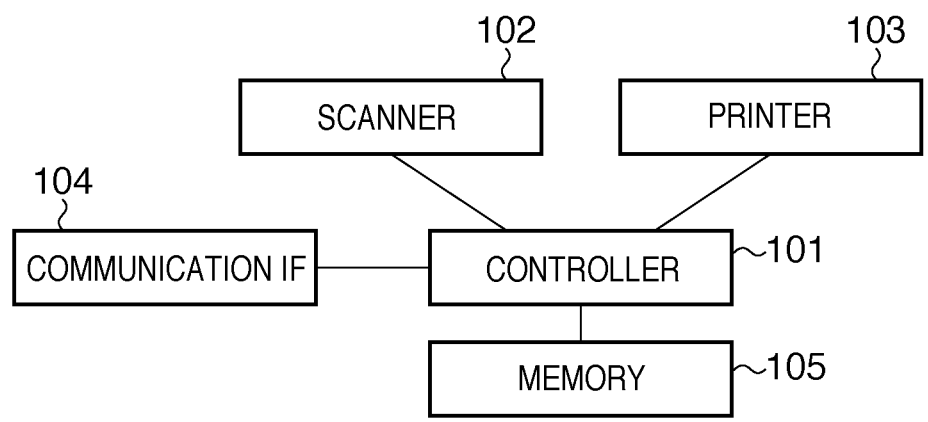
FIG. 1 is an overall block diagram of an image processing apparatus according to an embodiment of the present invention.

FIG. 1 is an overall block diagram of an image processing apparatus according to an embodiment of the present invention. An MFP (Multi-Functional Printer) which scans, prints, and copies is assumed as the image processing apparatus according to the embodiment of the present invention. The image processing apparatus includes a controller 101, scanner 102, printer 103, communication IF 104, and memory 105.

The controller 101 is a part which controls the overall image processing apparatus. The controller 101 is electrically connected to each block including the scanner 102 and printer 103, and performs control to implement sophisticated functions. The controller 101 will be described in more detail later. The scanner 102 is a block which optically reads a document image and converts it into an electrical image signal, and includes, for example, a contact image sensor, reading driving unit, and reading ON control unit. In scanning the entire document by the contact image sensor transported based on the control of the reading driving unit (not shown), an LED inside the contact image sensor undergoes ON control by the reading ON control unit. At the same time, a photosensor inside the contact image sensor optically reads the document image and converts it into electrical image data.

The printer 103 is a block which prints a visible image of the electrical image signal on printing paper, and includes a laser beam printer or an inkjet printer. The communication IF 104 is a block which exchanges data with external devices, and connects to the Internet network or a LAN, connects to a public telephone line to perform facsimile communication, or connects to a PC (Personal Computer) via a USB interface. The memory 105 is a memory device such as a DDR-SDRAM or an HDD, and not only temporarily stores image data but also stores, for example, a control program and data used by the controller 101 to implement the functions of the image processing apparatus. The memory 105 also stores composition information necessary to compose image data.

Figure 2:
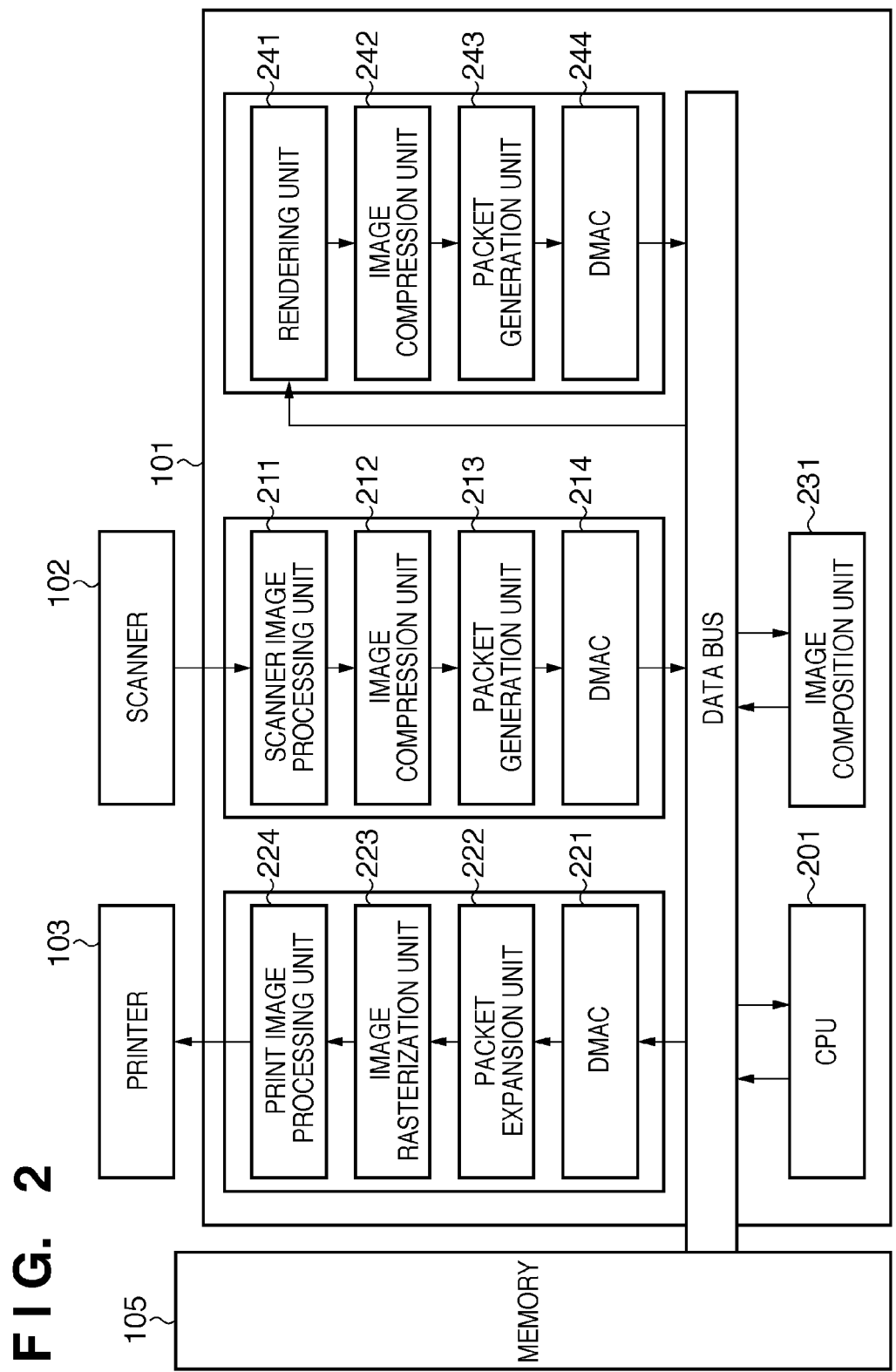
FIG. 2 is a block diagram of a controller 101 shown in FIG. 1 according to the embodiment.

FIG. 2 is a block diagram of the controller 101. The controller 101 includes a CPU (Central Processing Unit) 201, a scanner image processing unit 211, image compression units 212 and 242, and packet generation units 213 and 243. The controller 101 also includes DMACs (Direct Memory Access Controllers) 214, 221, and 244, a packet expansion unit 222, an image rasterization unit 223, a print image processing unit 224, an image composition unit 231, and a rendering unit 241.

An overview of each unit will be described below. The CPU 201 controls the overall controller 101. The CPU 201 reads out and executes a computer-readable program stored in a storage unit such as the memory 105 to control each unit. The scanner image processing unit 211 performs, for example, shading correction of the image data read by the scanner 102, and its various types of image processing such as MTF correction, color conversion processing, filter processing, and gamma correction processing. After that, the scanner image processing unit 211 transfers the image data to the image compression unit 212. The image compression unit 212 will be described in detail. First, a block of 2×2 pixels is extracted from the image data for each page, received from the scanner image processing unit 211, and is compressed.

Before a description of processing by the image compression unit 212, the number of combinations of colors that occupy data of 2×2=4 pixels will be considered in accordance with the number of these colors. A block of 2×2 pixels includes four pixels, so a maximum of four colors occupy the block, and combinations of only one to four colors exist in this block. The number of possible pattern combinations of four colors will be explained with reference to FIG. 3. First, when the block has only one color, the four pixels have the same color, so only one combination exists. A case in which the block has two colors will be considered next (the respective colors will be referred to as first and second colors hereinafter). When two colors are laid out in the four pixels assuming that a pixel at a predetermined position (the upper left pixel in this embodiment) has a first color, the first color or a second color is assigned to the three pixels other than the upper left pixel, so a total of seven combinations are possible upon excluding a combination when the four pixels have the same color.

A case in which the block has three colors (first to third colors) will be considered. When three colors are laid out in the four pixels, one of the three colors is used twice, so the number of combinations when two out of the four pixels have the same color need only be obtained. In other words, in case of three colors, two coordinate positions are selected from the four coordinate positions, so a total of six combinations are possible. When the block has four colors (first to fourth colors), only one pattern exists.

A total of 15 patterns are possible upon counting up the number of patterns in all these cases of one to four colors. Considering that flags are assigned to all these patterns to specify them, 4 bits are necessary as the amount of data. This takes place, as shown in FIG. 4, and flags indicating the arrangement patterns of colors will be referred to as "pattern flags" hereinafter. The number and arrangement pattern of colors in the block can be specified based on the thus defined pattern flag.

[Compression Processing]

Figure 5:
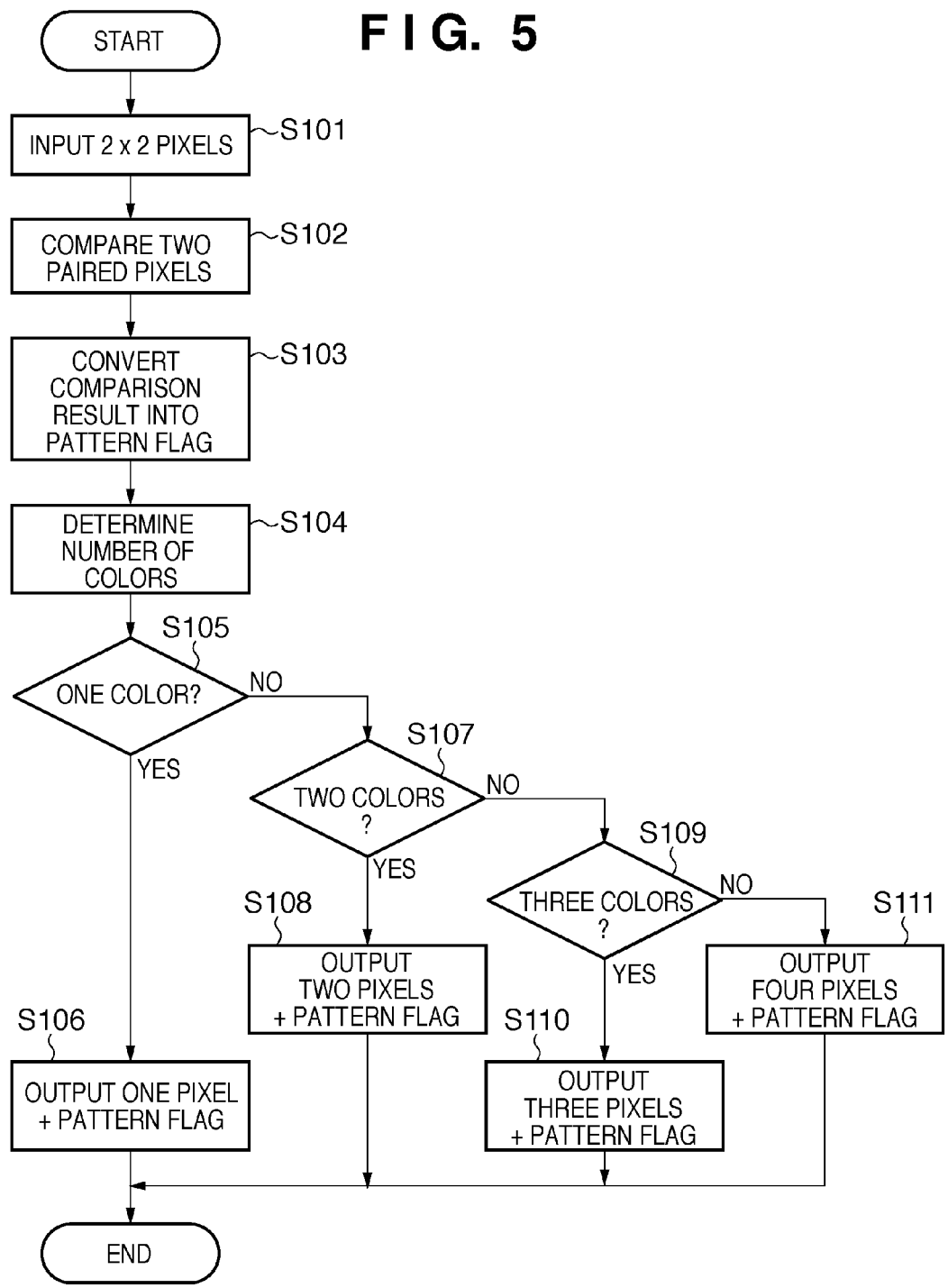
FIG. 5 is a flowchart showing the sequence of image compression according to the embodiment.

The sequence of compression processing by the image compression unit 212 will be described with reference to FIG. 5 in consideration of possible combinations of 2×2 pixels as mentioned above. In the following description, an image having, for example, R, G, and B (Red, Green, and Blue) components each with 8 bits and 256 gray levels is used as an input, and a 24-bit image for each pixel in a dot sequential system of 8-bit data is used as data. Note that image data to be compressed may be divided into blocks in advance, or the image processing apparatus may include a division unit.

When the processing starts, first, a block of 2×2 pixels is input (S101). For all combinations of two pixels within the input block, sets of 24 bits are compared (S102). If it is determined as a result of this comparison that all the bits coincide with each other (that is, that the two pixels have the same pixel value), 1 is output; otherwise, 0 is output. As shown in FIG. 6, assuming that the upper left, upper right, lower left, and lower right pixels of 2×2 pixels have coordinate positions 1, 2, 3, and 4, respectively, a total of six sets of two pixels 1-2, 1-3, 1-4, 2-3, 2-4, and 3-4 exist. Hence, six comparisons must be made, so 6 bits are output as a result. For example, if all of the four pixels have the same color, is are output as all comparison results; or conversely, if all of the four pixels have different pixel values, 0s are output as all comparison results. As described earlier, 15 patterns may occur upon color matching among the four pixels, so the 6-bit comparison results can be converted into a 4-bit pattern flag (S103).

Figure 7:
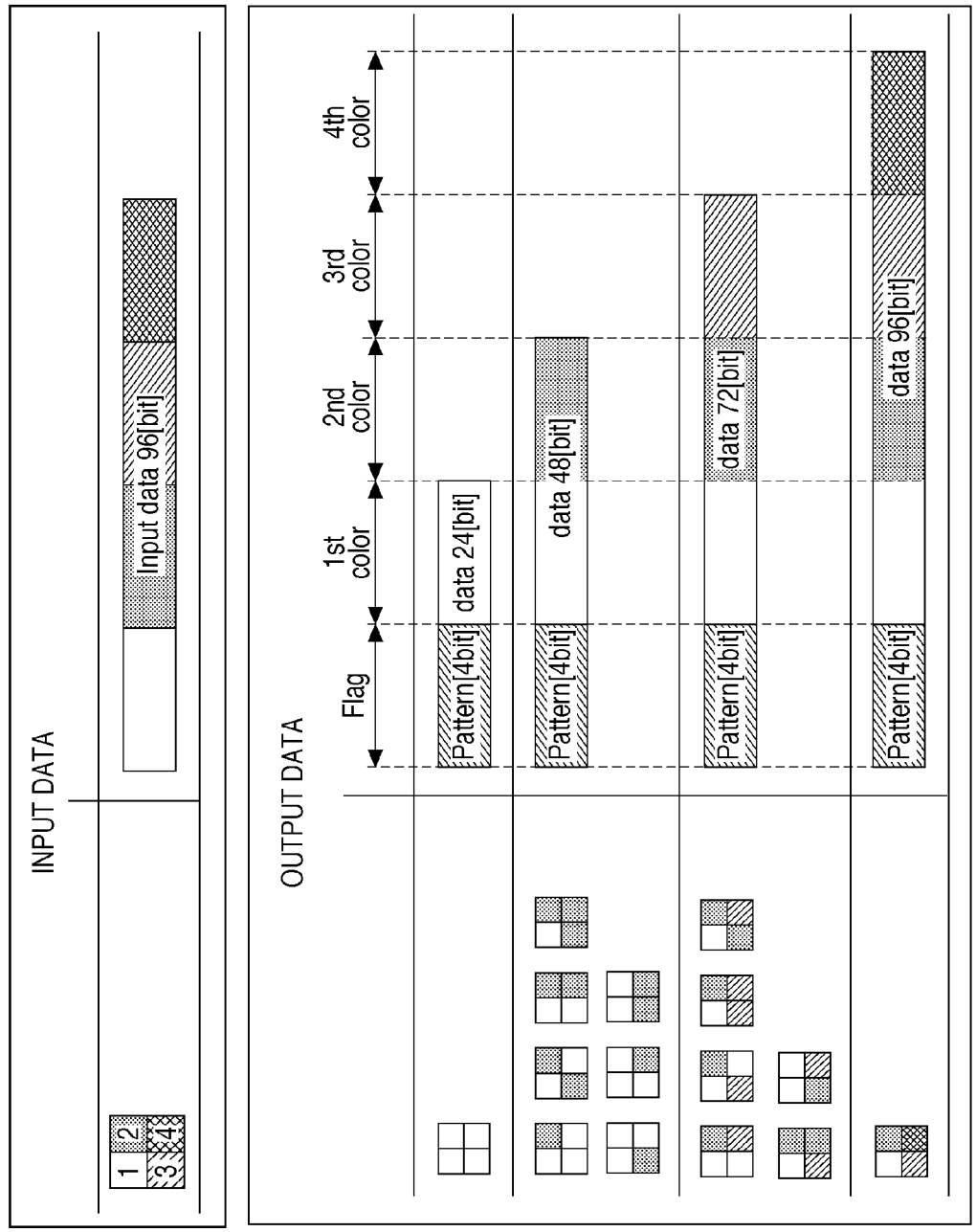
FIG. 7 is a view showing the relationship between the input and output upon compression processing according to the first embodiment.

After the conversion into a 4-bit pattern flag, the number of colors that have occurred in the four pixels and color data are extracted (S104). The positions of second and subsequent colors assuming that the color positioned at the upper left in the block has a first color can be obtained from the pattern flag. The processes in steps subsequent to step S104 of the image compression processing will be described with reference to FIG. 7. If it is confirmed that, for example, the four pixels have only one color (S105), none of second and subsequent colors exist. Therefore, the pixel value of the first color is obtained from the upper left pixel, and 4 bits of the pattern flag and 24 bits (8 bits of each of R, G, and B components×3) of the pixel value of the first color are output (S106). Similarly, if it is confirmed that the four pixels have two colors (S107), the coordinate position of the second color is calculated from the pattern flag, and 4 bits of the pattern flag and 48 bits of the pixel values of the two colors are output (S108). The same applies to three or four colors (S109 & S110 or S111). At this time, color data that have not previously occurred are stored in ascending order of coordinate position of the pixel in the block (in the order of the upper left, upper right, lower left, and lower right pixels). With the foregoing processing, color data is acquired and a pattern flag is specified.

In this manner, by outputting a 4-bit pattern flag and pixel values equal in number to colors existing in a block including 2×2 pixels from input data (96 bits) of four colors within the block, the amount of output data can be reduced with relatively simple processing. Also, the number of colors within the block can be specified by referring to the pattern flag. Data compression of the entire image field can be performed by performing this processing for all image blocks.

Figure 8:
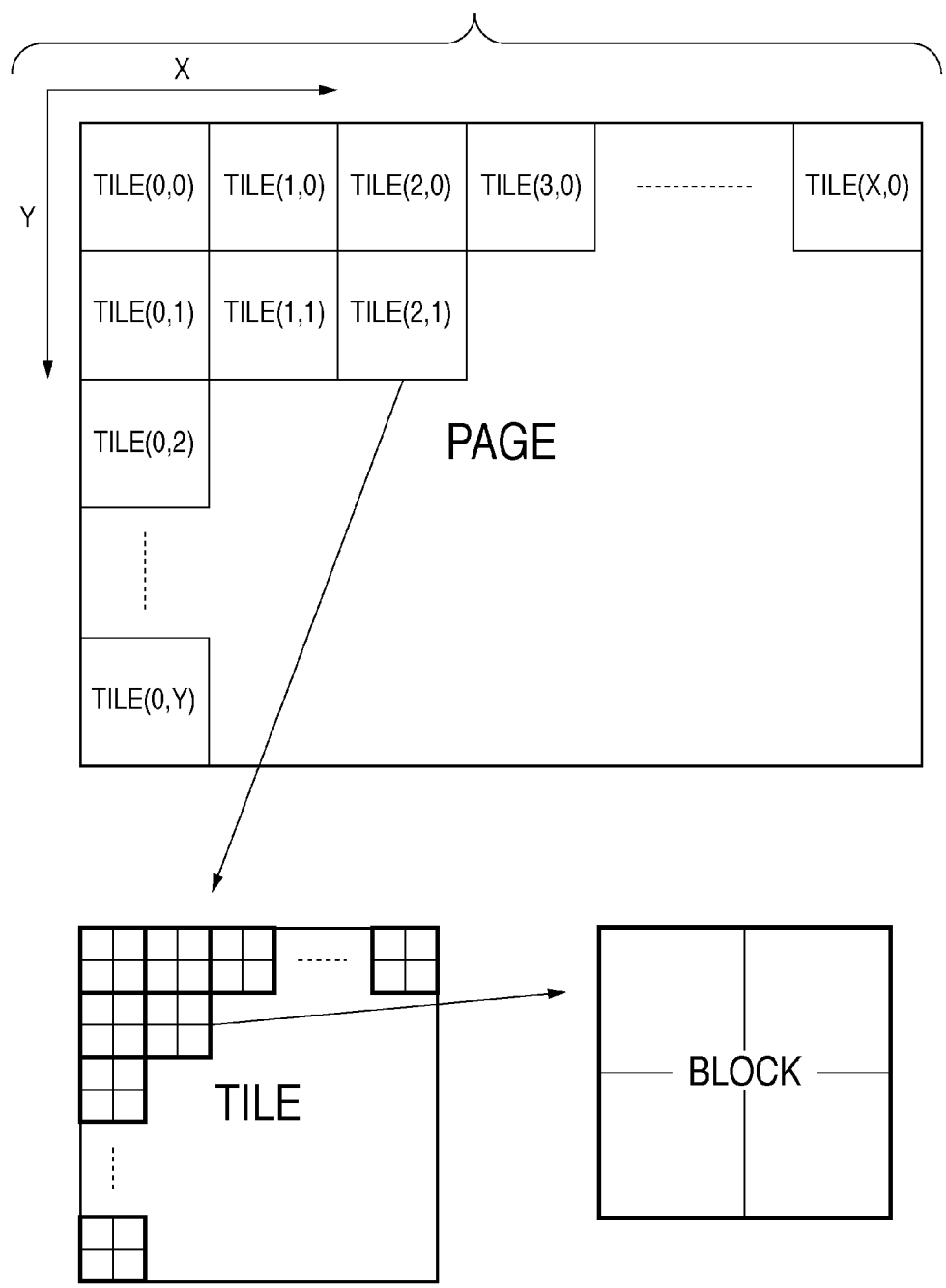
FIG. 8 is a view showing the relationship among a page, tiles, and blocks according to the first embodiment.

The packet generation unit 213 divides the image data, compressed by the image compression unit 212, into units each including a predetermined number of pixels (the unit including a predetermined number of pixels is a set of 32×32 pixels and will be referred to as a tile in this embodiment), reads them out, and assigns header information with a predetermined fixed length to each tile. FIG. 8 shows the relationship between tiles and blocks. As shown in FIG. 8, each page of the input image data is divided into a plurality of tiles. Each divided tile is further divided into a plurality of blocks. Although each block includes 2×2 pixels and each tile includes 32×32 pixels in this embodiment, the present invention is not limited to this, and the numbers of pixels in each block and tile may be changed as needed. For example, the block size is set to a size of M×N pixels (M and N are integers of 2 or more). Note that the tile size is set to a constant multiple of the block size (for example, 2K×2L (K and L are integers of 2 or more) when the block size is, for example, 2×2 pixels). However, when the block size is changed, the number of pattern flags and that of bits necessary for the pattern flags also change, as a matter of course.

[Structure of Compressed Data]

A data structure obtained upon compressing input image data will be described next. Assuming that the input image data is compressed for each tile mentioned above, the compressed data of each tile has a header. The header describes, for example, the page ID, the tile coordinate position, the color space, the number of bits of pixel data, and the data size of a tile. The page ID describes an ID number which is uniquely assigned to each page. The tile coordinate position describes the position of the tile on a raster image for each page. The tile coordinate position is represented by a two-dimensional coordinate system defined by X- and Y-coordinates.

Figure 9:
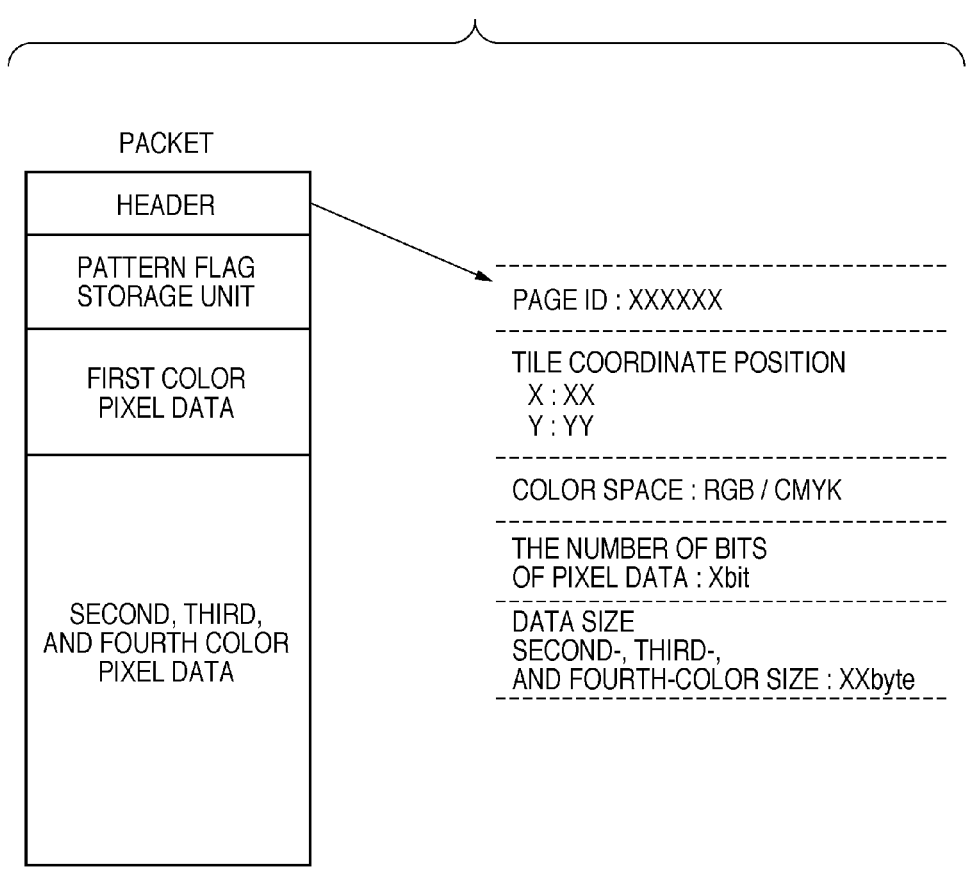
FIG. 9 is a view showing the packet and header configurations according to the first embodiment.

The color space describes an identifier used to identify whether the tile is an RGB image, a CMYK image, or a grayscale image. The number of bits of pixel data describes the bit length per pixel within the tile. The data size describes the size of pixel data of the second, third, and fourth colors of the tile in units of bytes. FIG. 9 shows a data structure including these types of information. The unit of data including the tile and header will be referred to as a packet hereinafter.

A method of generating a packet data structure will be described. The data generated by the image compression unit 212 can be roughly classified into three data types: a pattern flag, first color pixel data (first color data), and second, third, and fourth color pixel data (second to fourth color data). In an image which has 8 bits for each of R, G, and B colors and includes 32×32 pixels serving as each tile, the size of each data is defined by:

Data Size (4 Bits in Each Block) of Pattern Flag:
4×16×16/8=128 Bytes

Data Size (24 Bits in Each Block) of First Color Pixel Data: 24×16×16/8=768 Bytes Data Size (Maximum of 72 Bits in Each Block) of Second, Third, and Fourth Color Pixel Data:
Maximum of 72×16×16/8=2304 Bytes The data size of second, third, and fourth color pixel data differs between individual image data, and has a minimum value of 0 byte.

A storage unit which can store these data sizes is provided in the packet generation unit, and collectively stores data of the same data type in the same area. By adding a header after compression processing is completed for each tile and the data sizes are confirmed, a packet data structure as shown in FIG. 9 can be formed.

Pixel values are stored and held in memory areas subsequent to that for first color pixel data without quantization or encoding for each pixel. In other words, color processing (for example, color conversion which uses an LUT, gamma correction processing, and color space conversion processing which uses a matrix operation) which is completed by one pixel input/output can be directly performed without the need to refer to a pattern flag and expand compressed data. Directly using compressed data in this way, the transfer efficiency on a memory bus improves, and data with pixels fewer than the original image is processed, thus allowing high-speed processing.

Also, upon storing and holding image data on the memory, as shown in FIG. 9, the image results obtained by sampling pixels at the upper left coordinate positions in blocks each including 2×2 pixels of the image data continuously exist on the memory in the first color pixel data area. A first holding unit is thus implemented. The image processing apparatus described in this embodiment has functions of, for example, preview display of accumulated PDL (Page Description Language) image data and scanned image data, and the above-mentioned network transmission. For example, even if the print resolution is 600 dpi, the preview display and transmission normally do not require such a high resolution but require only a resolution of 300 dpi or less in many cases. When reduced data used in such cases must be obtained, a raster image with a half size can be easily obtained by processing only first color pixel data, which is read out from the first color pixel data area, without using a pattern flag and second, third, and fourth colors.

[Packet Management Table]

An arbitrary packet can be accessed by listing the tile coordinate positions, the packet sizes, and the addresses at which packets are located, and generating a packet management table including these types of information. FIG. 10A illustrates an example of the packet management table. When image data is written on the memory as a packet for each tile in this way, the size differs for each packet, as shown in FIG. 11, so the start addresses of the respective packets do not have constant spacings between them. Hence, the packet management table is searched for the start address of a packet at an arbitrary coordinate position. In this manner, arbitrary data can be accessed for each tile, thus making it possible to partially process image data.

The packet generation unit 213 transfers the generated packet to the DMAC 214. The DMACs 214, 221, and 244 have a DMA (Direct Memory Access) function of controlling transfer of image data to/from the memory 105. The packet expansion unit 222 receives the packet from the DMAC 221. Also, the packet expansion unit 222 sends, to the image rasterization unit 223, the pattern flag, the first color pixel data, and the second, third, and fourth color pixel data, which are extracted from the header of the packet. The image rasterization unit 223 performs processing of restoring those data to raster image data of 2×2 pixels based on the pattern flag and pixel data as described earlier.

The print image processing unit 224 performs, for example, binarization processing, halftone processing, and color conversion processing such as that from the RGB format to the CMYK format for image data having undergone scanner image processing to convert it into halftone image data. Also, the print image processing unit 224 converts the resolution in accordance with the printing resolution, and performs various types of image processing such as image data scaling, smoothing, and density correction for the image data to convert it into high-resolution image data. The print image processing unit 224 then outputs the image data to, for example, a laser beam printer. The image composition unit 231 has a function of determining, based on composition information stored in the memory 105, a block to be composed, and composing this block.

The rendering unit 241 renders PDL data, which is sent from the communication IF 104, into raster RGB image data based on a display list which is interpreted and output by the CPU 201. After that, the image compression unit 242 performs image compression processing, equivalent to that performed by the image compression unit 212, for the image data. The packet generation unit 243 performs processing, equivalent to that performed by the packet generation unit 213, for the compressed data to generate a packet.

[Sequence of Processing]

Figure 12:
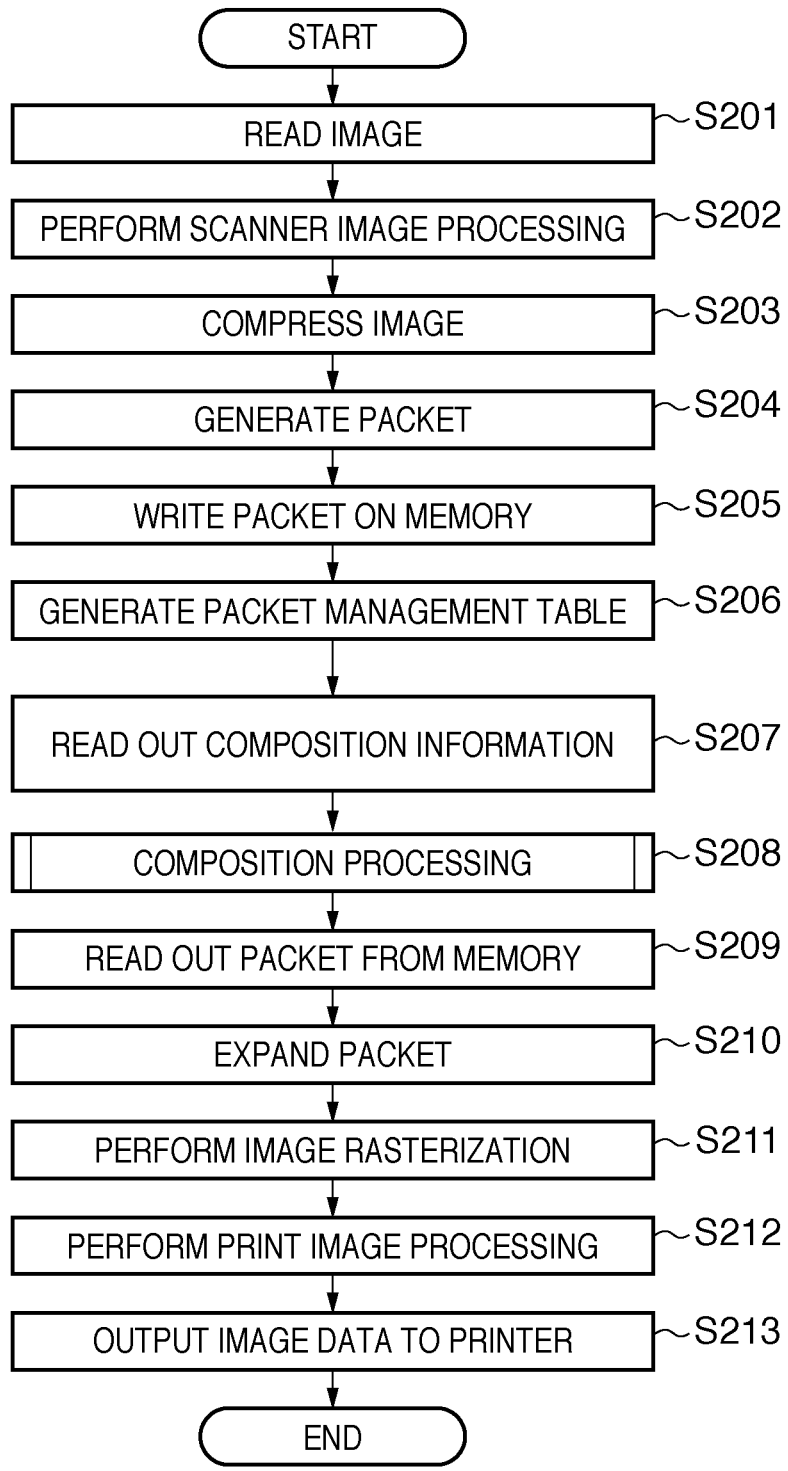
FIG. 12 is a flowchart showing the sequence of the operation of a controller according to the first embodiment.
Figure 19A:
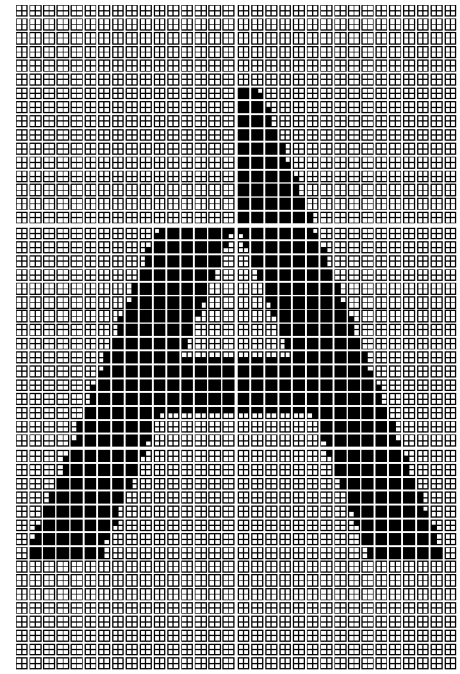
FIGS. 19A and 19B are overall schematic views before and after image composition according to the first embodiment.

FIG. 12 is a flowchart showing the operation of the image processing apparatus according to the first embodiment of the present invention. A series of processing of reading image data from the scanner, performing composition processing for the image data, and outputting the composed image data to the printer will be described in the first embodiment. Especially the sequence of image composition will be described in detail. Sample image data used in the following description has a size of 64×96 pixels and a resolution of 600 dpi (FIG. 19A illustrates an example of an image before composition processing). Each tile has a size of 32×32 pixels in packet generation. Image data to be composed has a size of 16×16 pixels for 300 dpi. Each packet header has a size of 16 bytes. Note that in this embodiment, this processing is performed by reading out and executing a program stored in a storage unit such as the memory 105 by the CPU 201, unless otherwise specified.

Figures 13, 14:
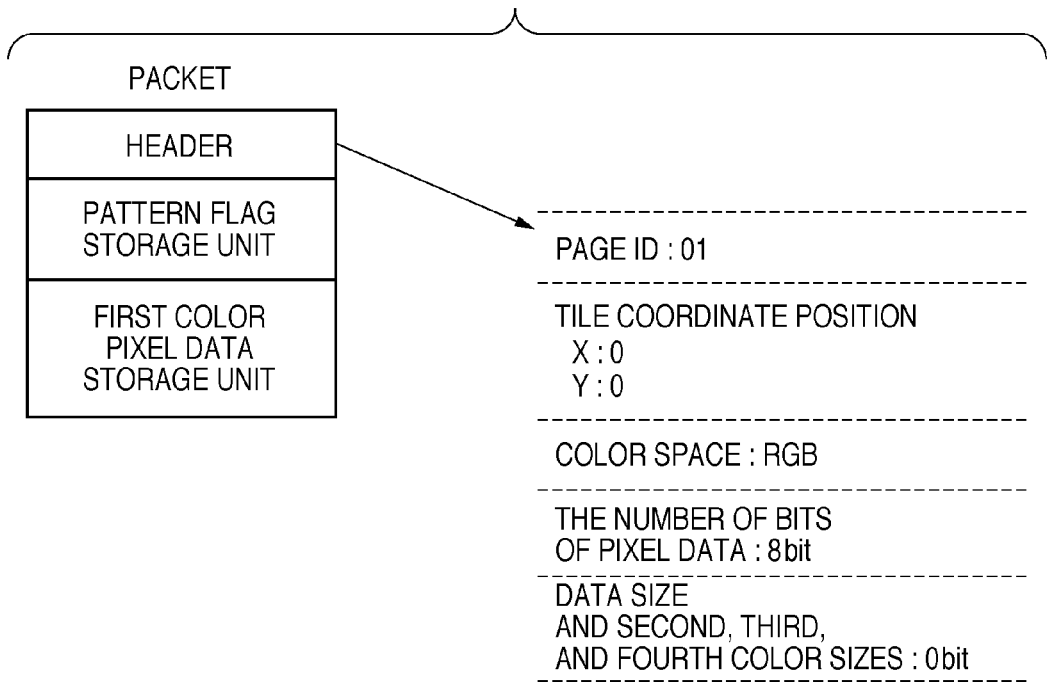
FIG. 13 is a view showing the packet and header configurations at a coordinate position (0, 0) according to the first embodiment.
FIG. 14 is a view showing composition information according to the first embodiment.

The scanner 102 reads image data in three, R, G, and B colors (S201). The scanner image processing unit 211 of the controller 101 performs image processing such as shading processing and filter processing (S202). The image compression unit 212 performs the above-mentioned image compression processing (S203). The packet generation unit 213 converts the compressed data into a packet (S204). The packet data is stored and held in the memory 105 via the DMAC 214 (S205). FIG. 13 shows the data structure of a packet represented by a tile coordinate position (0, 0). Note that in an example of the packet, shown in FIG. 13, 2×2 pixels have only one color and therefore have no second to fourth color pixel data. The CPU 201 generates a packet management table (S206). After that, the image composition unit 231 reads out information (composition information) concerning a composite image to be composed, which is stored in the memory 105 (S207). Processing of composing the composite image is performed for the packet data stored in the memory 105 by the image composition unit 231 (S208). FIG. 14 shows composition information in this embodiment. The composition information stores, for example, the resolution, color/shape information, and composition condition of a composite image.

The packet data which has undergone composition processing and is stored in the memory 105 is read via the DMAC 221 in accordance with the packet management table (S209). More specifically, addresses are designated and read out in turn from that of packet (0, 0) in the packet management table. The packet expansion unit 222 expands the packet (S210). The image rasterization unit 223 rasterizes the data into raster image data (S211). The raster image data is input to the print image processing unit 224, and undergoes area coverage modulation processing by the dither method or the error diffusion method (S212). The image data is output to the printer 103 (S213).

[Composition Processing]

Figure 15:
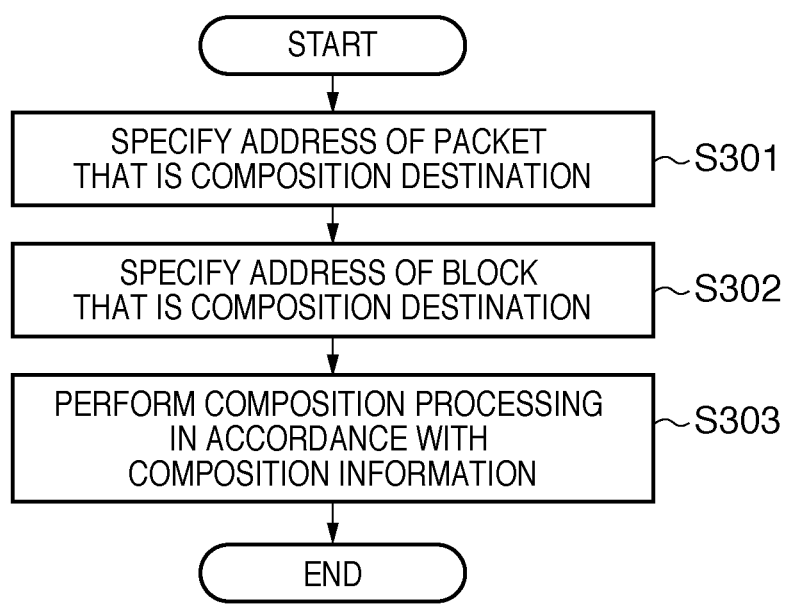
FIG. 15 is a flowchart showing the detailed sequence of the operation of an image composition unit 231 according to the first embodiment.

The composition processing (S208) by the image composition unit 231 will be described in detail below. FIG. 15 is a flowchart showing details of step S208 in FIG. 12. First, a corresponding packet is specified based on composition position information which is stored in the memory 105 and indicates the position at which composition is to be performed, and its address is specified based on the packet management table (S301). Although the composition information shown in FIG. 14 includes no composition position information in this embodiment, it may include composition position information. The addresses of a plurality of blocks to be composed within the packet are specified by referring to the composition information (S302). The block address specification will be described by giving a detailed example.

In this embodiment, the composition information includes coordinate position information indicating the coordinate position at which composition is to be performed, so the addresses of a plurality of blocks in a packet are specified using this information. FIG. 10B shows a packet management table in this embodiment. Assume that it can be determined based on the composition position information included in the composition information that a packet (to be referred to as packet (1, 2) hereinafter) represented by a coordinate position (1, 2) is to be composed. First, the image composition unit 231 specifies the address (0x10002348) of packet (1, 2) by referring to the packet management table. Next, a packet header size of 16 bytes is added (0x10002358) to access an address in a pattern flag storage unit. Because a pattern flag in one block has a fixed size of 4 bits, a pattern flag in a block to be composed can be specified as long as the number of this block in the packet can be determined. Because the pattern flag storage unit has a data size of 128 bytes, as described earlier, the start address of a first color pixel data storage unit can be easily specified. Because the first color in one block has a data size of 24 bits, first color pixel data in a block to be composed can be specified as long as the number of this block in the packet can be determined. Because the first color pixel data storage unit has a data size of 768 bytes, as described earlier, the start address of a second, third, and fourth color pixel data storage unit can be easily specified. The data size of second, third, and fourth color pixel data in each block can vary between individual images, as described earlier. FIG. 16 shows the size of second, third, and fourth color pixel data in a block of 2×2 pixels, which corresponds to the pattern flag. In this embodiment, one pixel has a pixel value with 24 bits (8 bits of each of R, G, and B components), and therefore has a size of 3 bytes. In the foregoing way, a plurality of blocks to be composed are specified, and composition processing is performed for compressed image data.

[Address Specification Processing]

Figure 17:
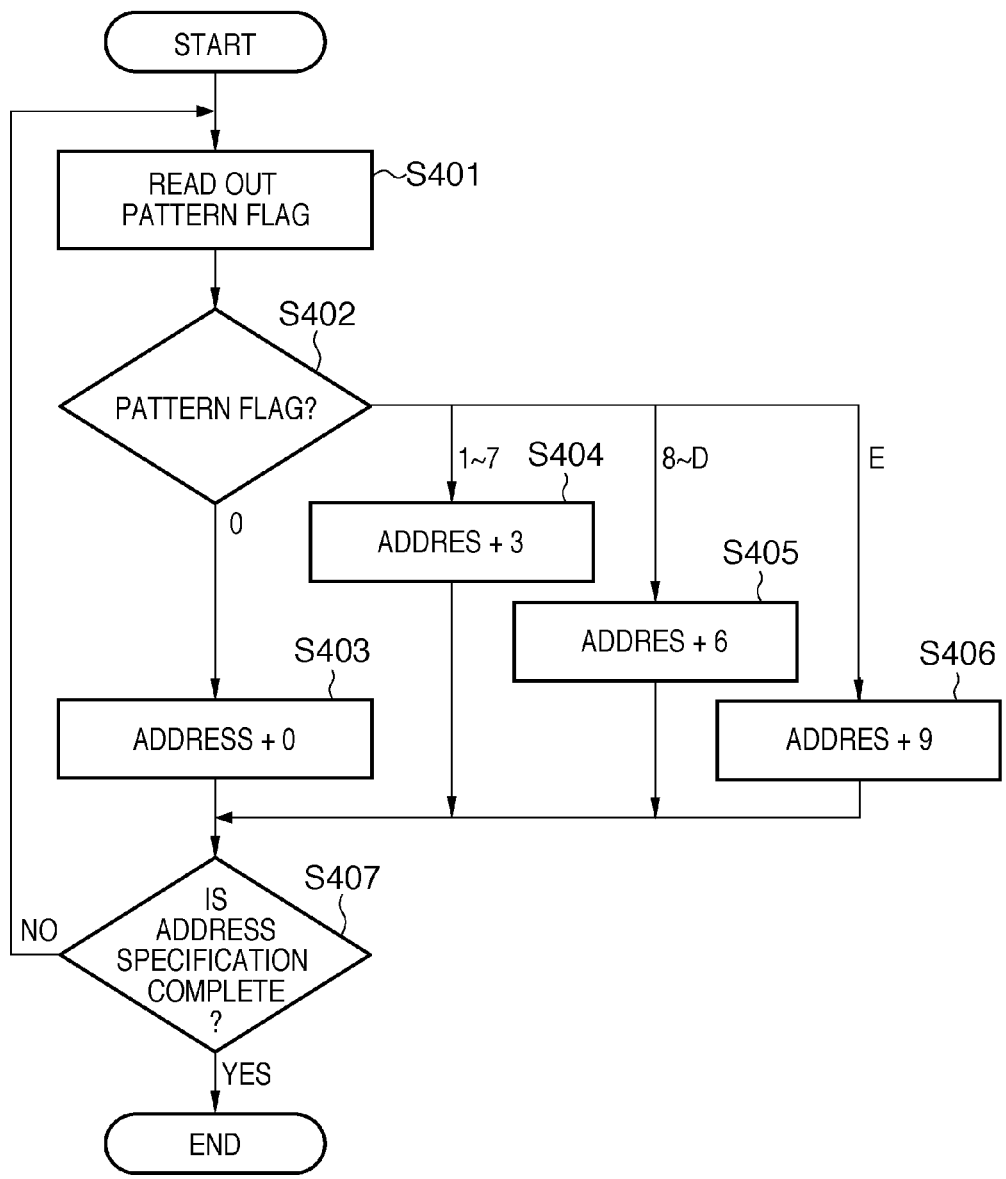
FIG. 17 is a flowchart showing the detailed sequence of address specification according to the first embodiment.

FIG. 17 is a flowchart showing a series of processing of specifying the address of second, third, and fourth color pixel data. Note that in this embodiment, this processing is performed by reading out and executing a program stored in a storage unit such as the memory 105 by the CPU 201, unless otherwise specified. First, pattern flags are read out in turn from the first pattern flag stored in the pattern flag storage unit in the packet (S401). The process branches to different subsequent steps in accordance with the value of the pattern flag (S402). If the pattern flag is 0, the address of the second, third, and fourth color pixel data is incremented by zero (S403). If the pattern flag is 1 to 7, the address of the second, third, and fourth color pixel data is incremented by three (S404). If the pattern flag is 8 to D, the address of the second, third, and fourth color pixel data is incremented by six (S405). If the pattern flag is E, the address of the second, third, and fourth color pixel data is incremented by nine (S406). The value added to the address in accordance with the value of the pattern flag changes depending on the type of color space of the packet and the number of bits of the pixel data. Also, the value added to the address is equal to that shown in FIG. 16.

It is determined based on the coordinate position information included in the composition information whether the address specification is complete (S407). If the address specification is incomplete, the process returns to pattern flag readout. In this manner, by sequentially reading out pattern flags, the address of second, third, and fourth color pixel data in each block can be specified.

FIG. 18 shows part of a list of pattern flags in packet (1, 2) and the address of second, third, and fourth color pixel data, which is calculated from the list. For example, the start address of the second, third, and fourth color pixel data in packet (1, 2) is 0x100026D8. A block (to be referred to as block (0, 3) hereinafter) which is represented by a coordinate position (0, 3) and occurs first among blocks to be composed will be taken as an example with reference to the composition information shown in FIG. 14. In this case, the addresses to be accessed are 0x100023E1 for first color pixel data, and 0x100026E1 for second, third, and fourth color pixel data.

First color pixel data and second, third, and fourth color pixel data in a block to be composed can be specified based on the thus specified addresses. The specified pixel data are acquired and processed in accordance with the color information (for example, the pixel value, the brightness, and the color difference) in the composition information and the composition condition (S303). If the composition condition is "overwriting", the pixel value (composition color) is written at the address at which first color pixel data in a block that is a composition destination is stored, and that at which second, third, and fourth color pixel data in this block are stored, thereby performing composition processing.

Figure 19B:
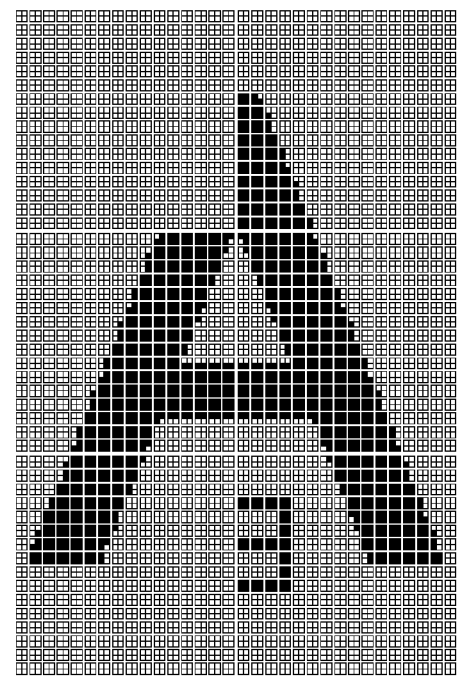

A case in which the composition color is black (R: 0, G: 0, B: 0), as shown in FIG. 14, will be described. As shown in FIG. 14, when the resolution of a composite image is 300 dpi, and that of original image data that is a composition destination is 600 dpi, all pixel values which form a block to be composed in the original image data need only be rewritten to represent black. That is, composition processing is performed by changing the pixel values of first color pixel data and second, third, and fourth color pixel data corresponding to a block to be composed to those representing black (R: 0, G: 0, B: 0). FIG. 19A is an overall view when image data before composition is expanded in this embodiment, and FIG. 19B is an overall view when image data after the composite image defined in FIG. 14 is expanded in this embodiment.

In the foregoing way, when image data is compressed using a relatively simple compression scheme, composition processing can be performed for compressed data of the image data without rasterizing the image data. This makes it possible to reduce the required memory size, thus providing a low-cost image processing apparatus.

Although compression has been described by taking as an example image data having R, G, and B components each with 8 bits, data represented by a CMYK color space, grayscale data, or data having pixel values other than 8 bits may be adopted. Also, not only overwriting but also, for example, alpha blending can be defined as a composition condition. In this case, after the pixel value of first color pixel data in a block that is a composition destination and those of second, third, and fourth color pixel data in this block are acquired, and the pixel values are alpha-blended with a composition color, the obtained data may be rewritten at the original addresses.

<Second Embodiment>

Composition of attribute data associated with pixel data, in addition to the raster image described in the first embodiment, will be described in the second embodiment. An image processing apparatus according to the second embodiment has the same configuration as that shown in FIG. 1, and a controller 101 has the same configuration as that shown in FIG. 2.

Attribute data (attribute value) is often assigned to each pixel of a raster image obtained by rendering PDL data. The attribute data is information such as a text, a photo, graphics, a background, or gray compensation. By assigning such attribute data associated with each attribute to each pixel, the attribute of each pixel can be discriminated. By selectively performing image processing suitable for each attribute data for image data assigned with this attribute data, appropriate image data can be obtained. It is possible to perform, for a pixel assigned with a text attribute, image processing which increases the contrast to improve the readability, and perform, for a pixel assigned with a photo attribute, image processing which is capable of excellent grayscale reproduction.

Image data assigned with such attribute information is generated by a rendering unit 241 shown in FIG. 2, and transferred to a memory 105 via an image compression unit 242, packet generation unit 243, and DMAC 244, as has been described in the first embodiment. In the second embodiment, the compression method having been described in relation to the image compression unit 242 is also applied to attribute data.

Figure 20:
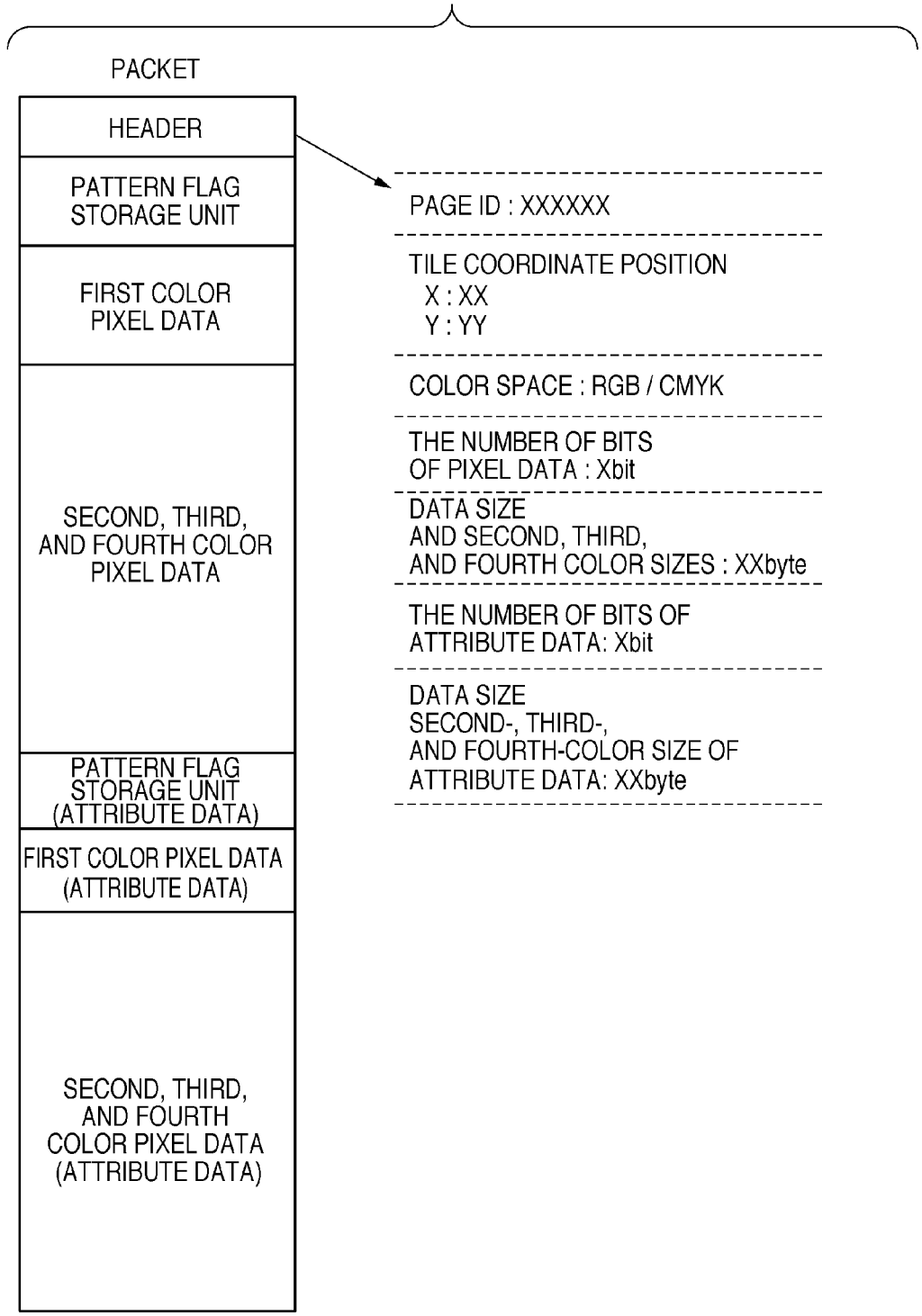
FIG. 20 is a view showing the packet and header configurations according to the second embodiment.

FIG. 20 shows a packet data structure in this embodiment. As can be seen from a comparison with FIG. 9, the number of bits of attribute data and the size of second, third, and fourth color pixel data (the size of second to fourth attribute data) of the attribute data are added to the packet header in FIG. 20. A pattern flag, first color pixel data of the attribute data, and second, third, and fourth color pixel data of the attribute data, which are obtained as a result of compressing the attribute data, are also added to the packet data structure. In this embodiment, for the sake of convenience, first attribute data included in a block of 2×2 pixels will be referred to as "first color pixel data of attribute data", and second, third, and fourth attribute data included in this block will be referred to as "second, third, and fourth color pixel data of the attribute data". Also in this embodiment, for the sake of convenience, a pattern flag indicating the arrangement of attribute data will also be referred to as a second pattern flag.

When the added attribute data has 8 bits, the size of each type of information of this attribute data is defined by:

Data Size (4 Bits in Each Block) of Second Pattern Flag: 4×16×16/8=128 Bytes

Data Size (8 Bits in Each Block) of First Color Pixel Data Storage Unit of Attribute Data: 8×16×16/8=256 Bytes Data Size (Maximum of 24 Bits in Each Block) of Second, Third, and Fourth Color Pixel Data Storage Unit of Attribute Data: Maximum of 24×16×16/8=768 Bytes The data size of second, third, and fourth color pixel data differs between individual image data, and has a minimum value of 0 byte.

Figure 21:
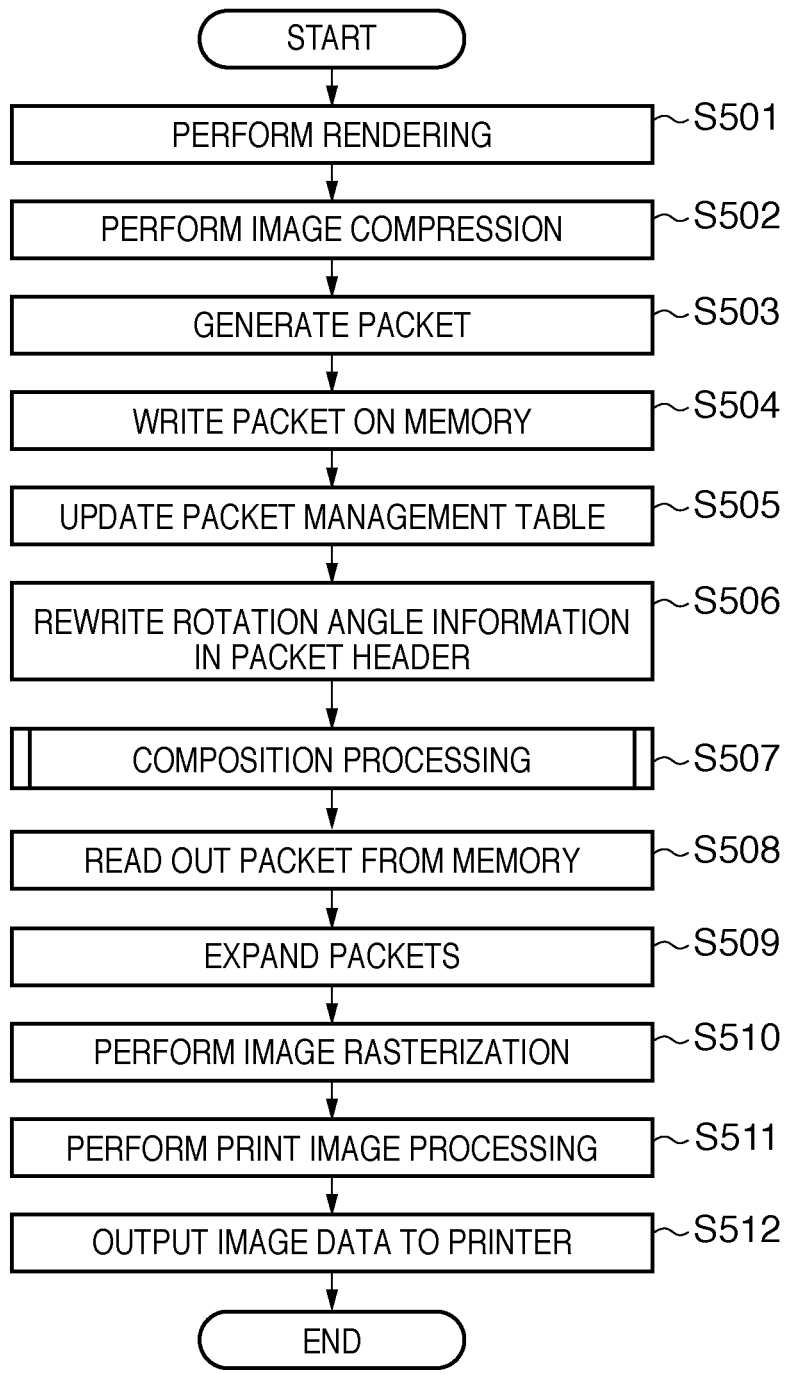
FIG. 21 is a flowchart showing the sequence of the operation of a controller according to the second embodiment.

FIG. 21 is a flowchart showing the operation of the image processing apparatus according to the second embodiment. A series of processing of reading out a display list (not shown) stored in the memory 105 by the rendering unit 241 to form image data, performing composition processing for the image data, and outputting the image data to a printer will be described in the second embodiment. Especially the sequence of image composition will be described in detail. Note that in this embodiment, this processing is performed by reading out and executing a program stored in a storage unit such as the memory 105 by a CPU 201, unless otherwise specified.

Image data used herein has a size of 64×96 pixels and a resolution of 1,200 dpi. Each tile has a size of 32×32 pixels in packet generation. Image data to be composed has a size of 16×16 pixels for 600 dpi. Each packet header has a size of 16 bytes.

The rendering unit 241 reads out and renders a display list stored in the memory 105 (S501). The image compression unit 242 performs image compression processing for the rendered image data (S502). The packet generation unit 243 converts the compressed data into a packet (S503). The packet data is stored in the memory 105 via the DMAC 244 (S504). The CPU 201 generates a packet management table (S505). After that, an image composition unit 231 reads out information (composition information) concerning a composite image to be composed, which is stored in the memory 105 (S506). Processing of composing the composite image is performed for the packet data stored in the memory 105 by the image composition unit 231 (S507). FIG. 22A shows composition information in this embodiment. The composition information shown in FIG. 22A stores, for example, the resolution, color/shape information, composition condition, and attribute data of composite image data.

The packet data which has undergone composition processing and is stored in the memory 105 is read via a DMAC 221 in accordance with the packet management table by CPU201 (S508). More specifically, CPU201 designates address and read out in turn from that of packet (0, 0) in the packet management table. A packet expansion unit 222 expands the packets (S509). An image rasterization unit 223 rasterizes the data into raster image data (S510). The raster image data is input to a print image processing unit 224, and undergoes area coverage modulation processing by the dither method or the error diffusion method (S511). The image data is output to a printer 103 (S512).

[Composition Processing]

Figure 23:
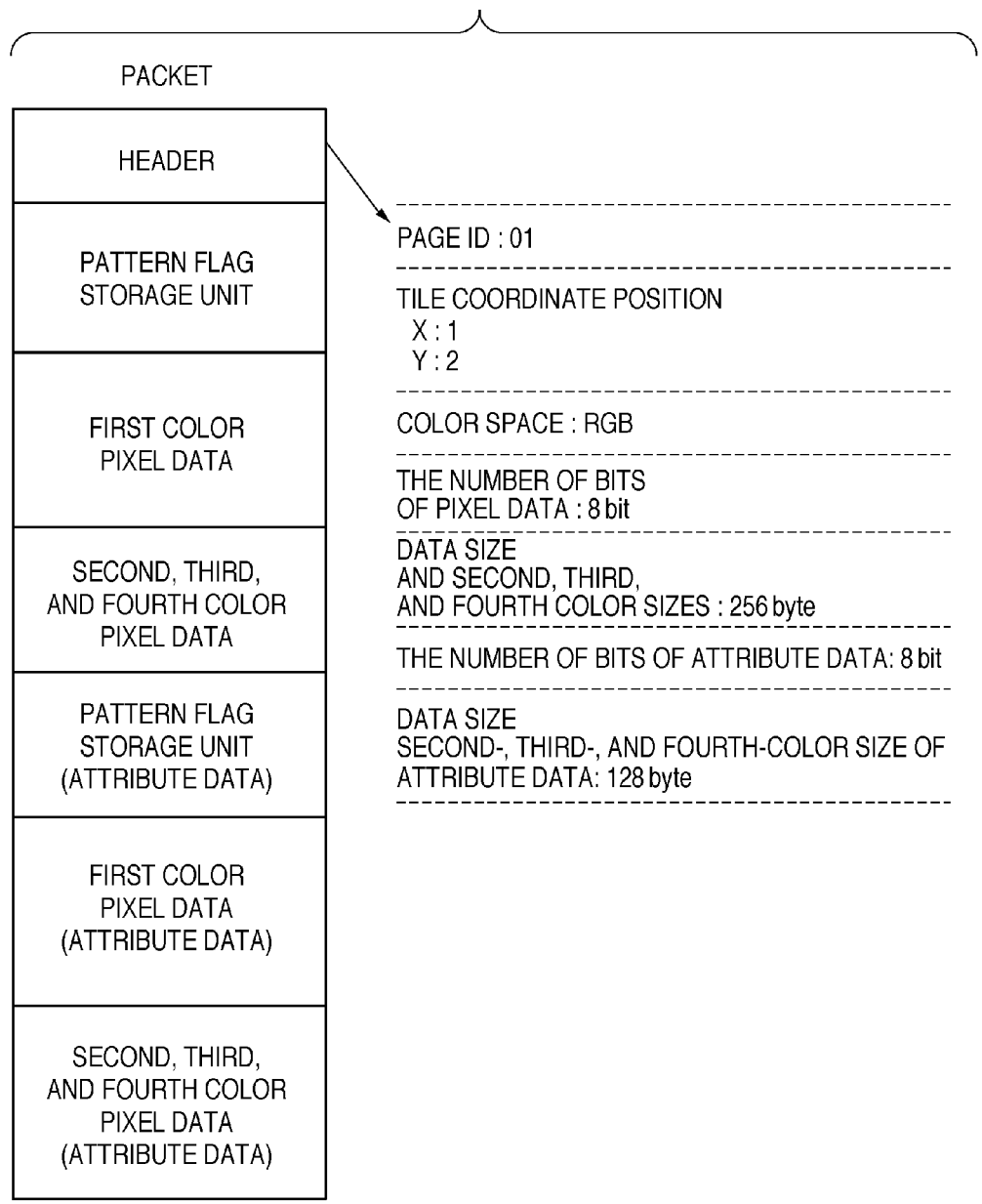
FIG. 23 is a view showing the packet and header configurations at a coordinate position (1, 2) according to the second embodiment.

The composition processing (S507) by the image composition unit 231 will be described in detail below. A flowchart showing details of S507 in the second embodiment is the same as that shown in FIG. 15. Block address specification in the second embodiment will be described. FIG. 22B shows a packet management table in this embodiment. Assume that it can be determined based on composition position shown in FIG. 22B that a packet (to be referred to as packet (1, 2) hereinafter) represented by a coordinate position (1, 2) is to be composed. FIG. 23 shows the data structure of packet (1, 2). First, the image composition unit 231 specifies the address (0x10005000) of packet (1, 2) by referring to the packet management table. Next, a packet header size of 16 bytes is added (0x10005010) to access an address in a pattern flag storage unit, thereby specifying the address of second, third, and fourth color pixel data. FIG. 24A shows a list of pattern flags in packet (1, 2) and the address of second, third, and fourth color pixel data, which is calculated from the list. The start address of the second, third, and fourth color pixel data in packet (1, 2) is 0x10005390, which is obtained by adding the sizes of the header, pattern flag, and first color pixel data to the start address (0x10005000) of that packet. Taking as an example a block (to be referred to as block (0, 3) hereinafter) which is represented by a coordinate position (0, 3) and occurs first among blocks to be composed, the addresses to be accessed are 0x10005096 for first color pixel data, and 0x10005399 for second, third, and fourth color pixel data.

Address specification is performed for attribute data in accordance with the same procedure. Because a pattern flag (second pattern flag) of attribute data and first color pixel data of the attribute data have fixed lengths, the start address of the first color pixel data of the attribute data and that of the second, third, and fourth color pixel data of the attribute data can be easily specified. Because first attribute data has a fixed size of 8 bits, "first color pixel data of attribute data" in a block to be composed can be specified as long as the number of this block in the packet can be determined. Because second to fourth attribute data (second, third, and fourth color pixel data of attribute data) in each block can vary between individual images, the address of second, third, and fourth color pixel data of attribute data for a block to be composed can be specified based on the start address of the second, third, and fourth color pixel data of the attribute data and a list of pattern flags of the attribute data in the packet. For the sake of convenience, specification of a pattern flag for attribute data is defined as second pattern flag specification, and processing of extracting second to fourth attribute data based on the second pattern flag is defined as second extraction processing. Also, holding the second to fourth attribute data extracted by the second extraction processing is defined as second holding. FIG. 24B illustrates an example of a list of pattern flags in packet (1, 2) and the address of attribute data corresponding to second, third, and fourth color pixel data, which is calculated from the list. In this way, the address at which attribute data for a block to be composed is stored can be specified.

Taking block (0, 3) as an example, the address of attribute data to be accessed is 0x10005613 for first color pixel data, and no second, third, and fourth color pixel data of the attribute data are present because the pattern flag of the attribute data is 0.

The stored pixel data and attribute data are acquired from the thus specified addresses and are processed in accordance with the color information in the composition information and the composition condition (S303). If the composition condition is "overwriting", the pixel value (composition color) is written at the address at which first color pixel data in a block that is a composition destination is stored, and that at which second, third, and fourth color pixel data in this block are stored, thereby performing composition processing. The same applies to attribute data, so the composition value of attribute data for a block that is a composition destination is written at the address at which first color pixel data of the attribute data is stored, and that at which second, third, and fourth color pixel data in this block are stored, thereby performing composition processing.

When the resolution of composite image data is 600 dpi, and that of original image data that is a composition destination is 1,200 dpi, all pixel values (RGB values) and attribute data (attribute values) which form a block to be composed in the original image data need only be rewritten. That is, the pixel values of first color pixel data and second, third, and fourth color pixel data corresponding to a block to be composed are rewritten to represent a composition color ((R: 64, G: 64, B: 64) in case of FIG. 22A), as has been described in the first embodiment. Moreover, in the second embodiment, first color pixel data of attribute data and second, third, and fourth pixel data of the attribute data corresponding to the block to be composed are rewritten to represent a composition value (0xFF in case of FIG. 22A).

With this configuration, composition processing can be performed without rasterizing all compressed data even if image data associated with attribute data for each pixel is processed. Although compression of attribute data has been described by focusing attention on PDL image data herein, the same compression processing and composition processing can be performed even for scanned image data by assigning attribute data by image recognition. The attribute data is not limited to 8 bits per pixel, and an arbitrary number of bits such as 1, 4, or 16 bits can also be adopted.

<Other Embodiments>

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-105962, filed Apr. 30, 2010, which is hereby incorporated by reference herein in its entirety.

What is claimed is:

1. An image processing apparatus comprising:
a tile division unit configured to divide input image data into tiles each including a predetermined number of pixels;
a block division unit configured to divide each of the tiles, that are divided by said tile division unit, into blocks each having a size of M×N pixels;
a pattern flag specification unit configured to sequentially determine, as a processing object, each of the blocks divided by said block division unit, and to compare color data of respective pixels in the block that is the processing object, thereby specifying a pattern flag indicating an arrangement pattern of color data included in each of the blocks;
an extraction unit configured to extract first color data from a pixel at a predefined position in each of the blocks, and further to extract, from a block for which it is determined that the number of color data included in the block is one of 2 to 4, second color data to fourth color data corresponding to the arrangement pattern defined in the specified pattern flag;
a first holding unit configured to hold, in a memory, the pattern flag of each of the blocks, that is specified by said pattern flag specification unit, the first color data extracted by said extraction unit, and the second color data to fourth color data extracted by said extraction unit;
an address specification unit configured to specify addresses in the memory, at which the first color data and the second color data to fourth color data in a block to be composed are held, based on composite image data to be composed; and
a composition unit configured to rewrite the first color data and the second color data to fourth color data in the block to be composed, that are held at the addresses specified by said address specification unit, based on the color data of the composite image data.

2. The apparatus according to claim 1, wherein
each pixel of the input image data has attribute data in addition to the color data,
the image processing apparatus further comprises:
a second pattern flag specification unit configured to sequentially determine, as a processing object, each of the blocks divided by said block division unit, and to compare attribute data of respective pixels in the block that is the processing object, thereby specifying a second pattern flag indicating an arrangement pattern of attribute data included in each of the blocks;
a second extraction unit configured to extract first attribute data from a pixel at a predefined position in each of the blocks, and further to extract, from a block for which it is determined that the number of attribute data included in the block is one of 2 to 4, second attribute data to fourth attribute data corresponding to the arrangement pattern defined in the specified second pattern flag; and
a second holding unit configured to hold, in the memory, the second pattern flag of each of the blocks, that is specified by said second pattern flag specification unit, the first attribute data extracted by said second extraction unit, and the second attribute data to fourth attribute data extracted by said second extraction unit,
said address specification unit specifies addresses in the memory, at which the first color data, the second color data to fourth color data, the first attribute data, and the second attribute data to fourth attribute data for the block to be composed are held, based on the composite image data, and
said composition unit rewrites the first color data, the second color data to fourth color data, the first attribute data, and the second attribute data to fourth attribute data for the block to be composed, that are held at the addresses specified by said address specification unit, based on the color data and the attribute data of the composite image data.

3. The apparatus according to claim 1, wherein the block has a size of 2×2 pixels.

4. The apparatus according to claim 1, wherein the tile has a size of 32×32 pixels.

5. The apparatus according to claim 1, wherein said address specification unit specifies an address in the memory, at which each data of the block to be composed is held, based on a resolution of the input image data and a resolution of the composite image data.

6. The apparatus according to claim 1, wherein the composite image data includes at least one of position information indicating a composition position, a resolution, shape information indicating a shape of a composite image, a composition condition, color information of each pixel, position information of each pixel, and attribute data.

7. An image processing method comprising:
a tile division step of using a tile division unit to divide input image data into tiles each including a predetermined number of pixels;
a block division step of using a block division unit to divide each of the tiles, that are divided in the tile division step, into blocks each having a size of M×N pixels;
a pattern flag specification step of using a pattern flag specification unit to sequentially determine, as a processing object, each of the blocks divided in the block division step, and compare color data of respective pixels in the block that is the processing object, thereby specifying a pattern flag indicating an arrangement pattern of color data included in each of the blocks;
an extraction step of using an extraction unit to extract first color data from a pixel at a predefined position in each of the blocks, and further extract, from a block for which it is determined that the number of color data included in the block is one of 2 to 4, second color data to fourth color data corresponding to the arrangement pattern defined in the specified pattern flag;

a first holding step of using a first holding unit to hold, in a memory, the pattern flag of each of the blocks, that is specified in the pattern flag specification step, the first color data extracted in the extraction step, and the second color data to fourth color data extracted in the extraction step;

an address specification step of using an address specification unit to specify addresses in the memory, at which the first color data and the second color data to fourth color data in a block to be composed are held, based on composite image data to be composed; and a composition step of using a composition unit to rewrite the first color data and the second color data to fourth color data in the block to be composed, that are held at the addresses specified in the address specification step, based on the color data of the composite image data, wherein at least one of the above steps is performed by at least one processor.

8. A computer-readable medium storing a program for causing a computer to function as:

a tile division unit configured to divide input image data into tiles each including a predetermined number of pixels;

a block division unit configured to divide each of the tiles, that are divided by the tile division unit, into blocks each having a size of M×N pixels;

a pattern flag specification unit configured to sequentially determines, as a processing object, each of the blocks divided by the block division unit, and to compare color data of respective pixels in the block that is the processing object, thereby specifying a pattern flag indicating an arrangement pattern of color data included in each of the blocks;

an extraction unit configured to extract first color data from a pixel at a predefined position in each of the blocks, and further extracts, from a block for which it is determined that the number of color data included in the block is one of 2 to 4, second color data to fourth color data corresponding to the arrangement pattern defined in the specified pattern flag;

a first holding unit configured to hold, in a memory, the pattern flag of each of the blocks, that is specified by the pattern flag specification unit, the first color data extracted by the extraction unit, and the second color data to fourth color data extracted by the extraction unit;

an address specification unit configured to specify addresses in the memory, at which the first color data and the second color data to fourth color data in a block to be composed are held, based on composite image data to be composed; and a composition unit configured to rewrite the first color data and the second color data to fourth color data in the block to be composed, that are held at the addresses specified by the address specification unit, based on the color data of the composite image data.

* * * * *